(12) United States Patent
Kimoto et al.

(10) Patent No.: US 8,836,732 B2
(45) Date of Patent: Sep. 16, 2014

(54) IMAGE DISPLAY DEVICE

(75) Inventors: Takayuki Kimoto, Osaka (JP); Takaaki Gyoten, Hyogo (JP); Yoshimasa Fushimi, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 556 days.

(21) Appl. No.: 13/037,382

(22) Filed: Mar. 1, 2011

(65) Prior Publication Data
US 2011/0234647 A1   Sep. 29, 2011

(30) Foreign Application Priority Data

Mar. 26, 2010   (JP) ................................ 2010-071995

(51) Int. Cl.
*G09G 5/10*   (2006.01)
*G09G 3/00*   (2006.01)
*H04N 9/31*   (2006.01)
*G09G 3/34*   (2006.01)

(52) U.S. Cl.
CPC ........ *G09G 3/002* (2013.01); *G09G 2310/0235* (2013.01); *G09G 2320/0261* (2013.01); *H04N 9/3155* (2013.01); *G09G 3/346* (2013.01); *H04N 9/3111* (2013.01); *G09G 3/3413* (2013.01)
USPC ....................................................... 345/690

(58) Field of Classification Search
USPC .......... 345/690, 691, 204, 88; 349/25; 353/30
See application file for complete search history.

(56) References Cited

U.S. PATENT DOCUMENTS

| | | | |
|---|---|---|---|
| 5,969,710 A | 10/1999 | Doherty et al. | |
| 6,778,155 B2 | 8/2004 | Doherty et al. | |
| 6,911,963 B2 * | 6/2005 | Baba et al. | 345/88 |
| 7,221,636 B2 * | 5/2007 | Sako et al. | 369/59.25 |
| 2009/0128884 A1 * | 5/2009 | Sugimoto et al. | 359/290 |

FOREIGN PATENT DOCUMENTS

| | | |
|---|---|---|
| JP | 2008-020600 A | 1/2008 |
| JP | 2009-244717 A | 10/2009 |

* cited by examiner

*Primary Examiner* — Abbas Abdulselam
(74) *Attorney, Agent, or Firm* — James W. Judge

(57) ABSTRACT

An image display device includes a plurality solid-state light sources, a modulator configured to modulate light from a plurality of solid-state light sources, and an image display device configured to generate from a frame of image data, a plurality of subframes each further divided into subfields, and to display the plurality of subframes. The modulator turns off light output from all the solid-state light sources for the duration of one or more of the plurality of subframes, whereby it is possible to reduce motion blur arising from a hold-type display device, in which after-images remain on the retina of a person's eyes when viewing moving objects.

6 Claims, 8 Drawing Sheets

IMAGE DISPLAY DEVICE

CROSS-REFERENCE TO RELATED APPLICATION

The disclosure of Japanese Patent Application No. 2010-071995, filed on Mar. 26, 2010, is incorporated herein by reference.

BACKGROUND OF THE INVENTION

1. Field of the Invention

The present invention relates to image display devices that display color images, and more particularly relates to color-image displaying image display devices that control after-images in motion pictures.

2. Description of the Background Art

Conventionally, images are displayed on screens by using projectors which employ ultra high pressure mercury lamps. However, such conventional projectors have a relatively short life span, and have been prohibitive of realizing instant switch-on. In addition, the conventional projectors have insufficient luminance, and in most cases, due to the influence of such factors as the room lighting or the screen, have been prohibitive of representing, for example, a prepared chart with the colors visually recognizable as on the computer screen. Thus, to solve this problem, in recent years image display devices that are equipped with solid-state light sources such as light emitting diodes (LEDs) and laser diodes (LDs), in place of the conventional ultra high pressure mercury lamps, have been proposed.

In order to display color images, a conventional image display device is equipped with solid-state light sources which emit light having wavelengths of three primary colors (red (hereinafter referred to as "R"), green (hereinafter referred to as "G"), and blue (hereinafter referred to as "B")) and a modulator that is used in common for each of the solid-state light sources. The conventional image display device adopts a field sequential system which renders color images by high-speed flickering of the light from the solid-state light sources, and by controlling the modulator which modulates, in accordance with the flickering time, the light corresponding to the respective colors (e.g., see Japanese Laid-Open Patent Publication No. 2008-20600).

The conventional field sequential system has an R display period, a G display period, and a B Display period, which occur in order. In the R display period, only R-LEDs, which emit light having R wavelengths are lit, whereas the remaining light sources are turned off, and the modulator modulates only the R light. Accordingly, an R image is displayed. In the same manner, to display a G image and a B image, G-LEDs, which emit light having G wavelengths, and B-LEDs, which emits light having B wavelengths, are lit. The modulator then modulates the G light and the B light, respectively.

Another conventional image display device adopts a digital micromirror device (DMD, registered trademark of Texas Instruments Incorporated) as a modulator (e.g., see U.S. Pat. No. 5,969,710, and U.S. Pat. No. 6,778,155). This device employs a technique of bit splitting, in which during each of the R display period, the G display period, and the B display period, the DMD uniformly distributes within each period the time during which it reflects light from each light source, so as to reduce nonuniformity in light reflection time, thereby smoothing the luminance.

However, unlike impulse type display devices such as cathode-ray tubes, conventional hold-type display devices, such as DMD-employing image display devices and liquid crystal displays, cause a problem of generating image blur (motion blur) depending on the movement speeds of objects in moving images.

In order to reduce motion blur that arises in accordance with the moving speed of an object in a moving image, a technique of inserting a black signal synchronized to a vertical synchronization signal, as well as a technique of turning off the light that illuminates the display device have been disclosed. However, according to the conventional techniques, the black periods are distributed and the black period time span is short, and thus it has not been possible to reduce the motion blur sufficiently.

SUMMARY OF THE INVENTION

Therefore, an object of the present invention is to make available an image display device that can reduce motion blur, arising from a hold-type display device, in which after-images remain on the retina of a person's eyes when observing moving objects, and that enables the resolution of moving images to be improved.

To attain the above objects, the present invention has the following features. A first aspect of the present invention is an image display device for projecting and displaying an image on a screen, the device comprising: a plurality of solid-state light sources; a modulator configured to modulate light from the plurality of solid-state light sources; and an image display device configured to generate, from a frame of image data, a plurality of subframes that are each further divided into subfields, and to display the plurality of subframes. The modulator turns off light output from all the solid-state light sources for the duration of at least one or more subframes among the plurality of subframes.

With this configuration, a frame includes a period during which the light output from all of the solid-state light sources is turned off. Accordingly, it is possible to reduce motion blur, arising from a hold-type display device, in which after-images remain on the retina of a person's eyes when observing moving objects. In addition, since a frame includes a period during which the light output from all the solid-state light sources is turned off, power consumption can be reduced.

In a further aspect, the subframes during which the light output from all the solid-state light sources is turned off preferably includes, among the plurality of subframes, the initial or final subframe within a single frame period.

With this configuration, the center of the time-axis of a video display in a single frame period can be advanced/retarded, and thus it is possible to adjust the amount of delay with respect to lip-sync in a single frame.

In a further aspect, the one or more of the plurality of subframes during which the light output from all the solid-state light sources is turned off are preferably two or more consecutive subframes of the plurality of subframes.

With this configuration, it is possible to avoid after-images remaining on the retina of a person's eyes when observing moving objects as compared to a case of distributing the black periods during which the light output from all the solid-state light sources is turned off. And it is possible to further reduce motion blur arising from the hold-type display device.

In a further aspect, the number of the subframes during which the light output from all the solid-state light sources is turned off is preferably changed in accordance with the type of content and operating environment of the image display device.

For example, even if the number of subframes is fixed, there is a case where the duration of a subframe varies depending on the frequency of the vertical synchronizing signal. However, with the above-described configuration, the number of subframes during which the light output from all the solid-state light sources is turned off is set optimally.

Further, in accordance with the movement speed of an object in a moving image, in accordance with the signal type to be inputted, or in accordance with the type of content to be displayed, for example, the number of subframes during which the light output from all the solid-state light sources is turned off can be optimally set.

In a second aspect the present invention is an image display device for projecting and displaying an image on a screen, the device comprising: a plurality of light sources; a modulator configured to modulate light from the plurality of light sources; and an image display device configured to generate, from a frame of image data, a plurality of subframes each further divided into subfields, and to display the plurality of subframes. The image display device is configured to display one or more of the plurality of subframes in black.

With this configuration, even if the light output from all the solid-state light sources is not turned off, a black signal is inserted as a video signal thereby to realize a black display. Thus, it is possible to reduce motion blur, arising from a hold-type display device, in which after-images remain on the retina of a person's eyes when viewing moving objects.

In a further aspect, the one or more of the plurality of subframes displayed in black preferably includes, among the plurality of subframes, the initial or final subframe within a single frame period.

With this configuration, the center of the time-axis of a video display in a frame period can be adjusted, and thus, it is possible to adjust the amount of delay relative to lip-sync in the frame.

In a further aspect, the one or more of the plurality of subframes displayed in black are preferably two consecutive subframes of the plurality of the subframes.

With this configuration, it is possible to avoid after-images remaining on the retina of a person's eyes when viewing moving objects as compared to a case of distributing the black periods during which the light output from all the solid-state light sources is turned off. And it is possible to further reduce motion blur arising from the hold-type display device.

In a further aspect, the number of the subframes displayed in black is preferably changed in accordance with the type of content and operating environment of the image display device.

For example, even if the number of subframes is fixed, there is a case where the duration of a subframe varies depending on the frequency of the vertical synchronizing signal. However, with the above-described configuration, the number of subframes during which the light output from all the solid-state light sources is turned off is set optimally.

Further, in accordance with the movement speed of an object in a moving image, in accordance with the signal type to be inputted, or in accordance with the type of content to be displayed, for example, the number of subframes during which the light output from all the solid-state light sources is turned off can be optimally set.

As described above, with the image display device of the present invention, a frame period includes a period during which the light output from all the solid-state light sources is turned off, or during which a black signal is inserted as a video signal to realize a black display. Thus, it is possible to reduce motion blur, arising from a hold-type display device, in which after-images remain on the retina of a person's eyes when viewing moving objects. In addition, it is possible to improve the resolution of moving images.

The image display device according to the present invention can advantageously reduce motion blur of moving images displayed on an extensive color-gamut display which employs LED sources, and is suitable for high-definition high-resolution display such as a high definition television.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the accompanying drawings.

First Embodiment

An image display device according to a first embodiment of the present invention will be described with reference to FIG. 1.

Figure 1:
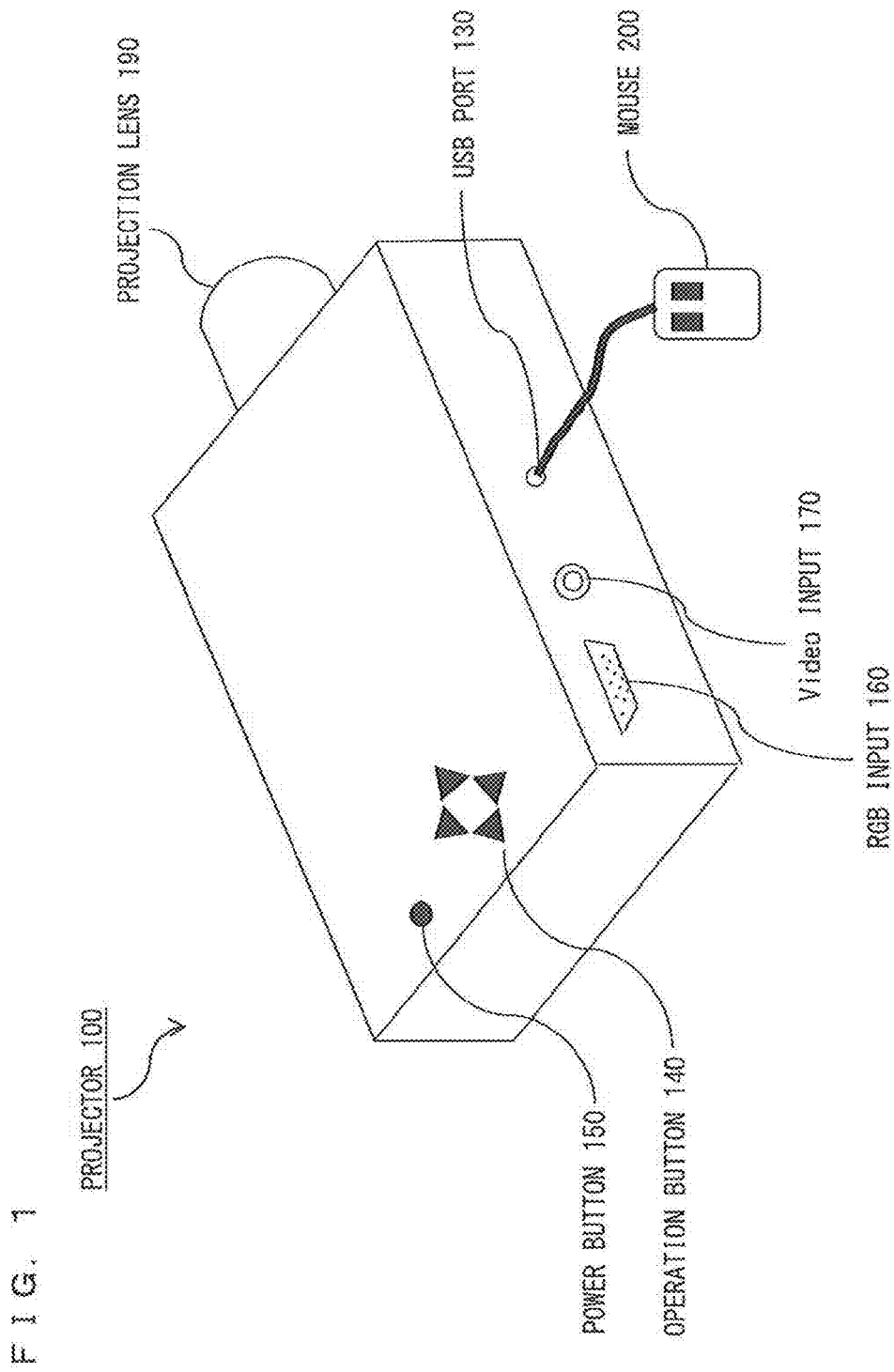
FIG. 1 is a configuration diagram illustrating the outer appearance of a projector 100, which is an image display device according to the present invention.

FIG. 1 is a configuration diagram illustrating the outer appearance of a projector 100, which is an image display device according to the present invention. In FIG. 1, when a user of the projector 100 presses a POWER button 150, power is fed to the projector 100. The projector 100 then processes video signals inputted thereto, and outputs enlarged projection images through a projection lens 190 by using a LED light source module (not shown) included in the projector 100.

The projector 100 includes, as input interfaces, an RGB input 160 and a video input 170, which are respectively connected to an external video signal output device (not shown) such as a personal computer. The projector 100 includes a USB port 130. If a mouse 200 is connected to the projector 100 via the USB port 130, the mouse accepts the user's operation, and functions as a pointer moving on a screen, on which the setting status of the projector 100 and enlarged projection images are displayed. Operation of the operation buttons 140 by the user also realizes the same function.

Figure 2:
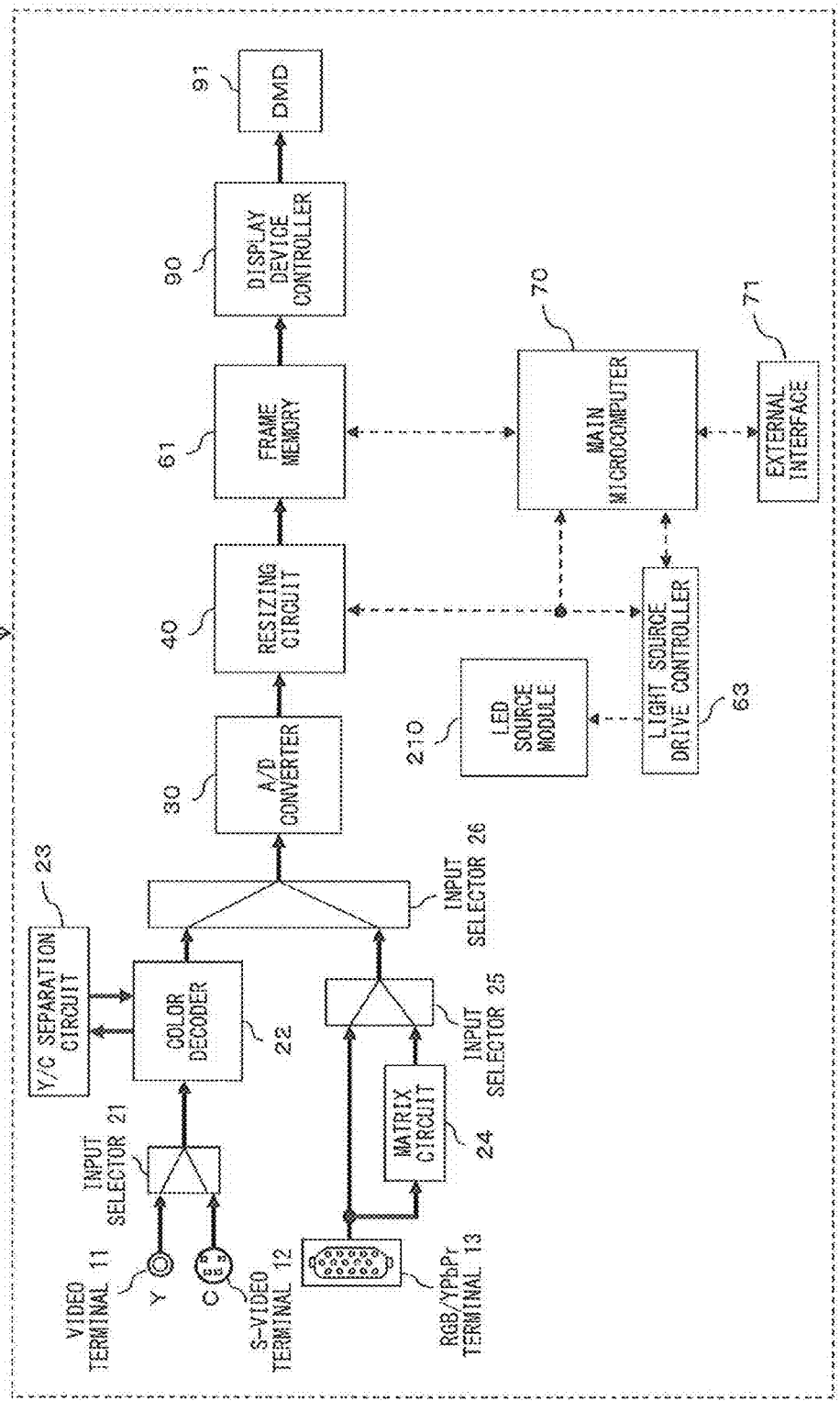
FIG. 2 is a functional block diagram illustrating the internal configuration of the projector 100.

Next, with reference to FIG. 2, the internal configuration of the projector 100 will be described. FIG. 2 is a functional block diagram illustrating the internal configuration of the projector 100.

A VIDEO terminal 11 receives inputs of composite video signals which are defined based on the National Television System Committee (NTSC) system and the Phase Alternating Line (PAL) system.

An S-VIDEO terminal 12 receives inputs of S-VIDEO signals.

An RGB/YPbPr terminal 13 receives inputs of RGB signals or YPbPr signals.

An input selector 21 is used for selecting either composite video signals inputted through the VIDEO terminal 11 or the S-VIDEO signals inputted through the S-VIDEO terminal 12.

A Y/C separation circuit 23 is a circuit which separates a composite video signal inputted through a color decoder 22 into a Y-signal and a C-signal.

The color decoder 22 performs color decoding of Y-signal and C signal, which have been subjected to Y/C separation by the Y/C separation circuit 23, or Y/C-signal into a YPbPr signal. The YPbPr signal is converted to the RGB signal by a matrix circuit (not shown).

The matrix circuit 24 is designed to perform matrix processing when the YPbPr signal inputted through the RGB/YPbPr terminal 13 is converted to the RGB signal.

An input selector 25 is used for selecting a signal representing either the RGB signal inputted through the RGB/YPbPr terminal 13 or the RGB signal generated by the matrix circuit 24.

An input selector 26 is used for selecting either the YPbPr signal generated by the color decoder 22 or the RGB signal inputted by the input selector 25. The signal to be inputted to the input selector 26 is an analog video signal, and the analog video signal selected by the input selector 26 is inputted to an analog/digital (A/D) converter 30.

The A/D converter 30 performs A/D conversion of the analog video signal selected by the input selector 26 to an 8-bit digital signal.

A resizing circuit 40 resizes the digital signal, which has been subjected to the A/D conversion by the A/D converter 30, so as to be displayed on the screen, in accordance with the number of pixels in a DMD 91.

The frame memory 61 converts the vertical frequency of the inputted signal to 50 Hz or 60 Hz, and includes data used for field sequential driving of the DMD 91.

A main microcomputer 70 controls the whole device, that is, controls the power supply (not shown), fan (not shown), temperature (not shown), input switching, and the like, for example. The main microcomputer 70 also sets the number of subframes that are to be displayed in black, based on the data from an external interface 71. The main microcomputer 70 controls a light source drive controller 63, based on the set number of subframes that are to be displayed in black.

In addition, the main microcomputer 70 forwards to the light source drive controller 63 the level of current of the LEDs to be driven, and sets the desired value in the LED light source module 210. The LED light source module 210 includes R-LEDs, G-LEDs, and B-LEDs.

A display device controller 90 controls driving of the DMD 91 so that the respective pixels corresponding to the R-LED, G-LED, and B-LED are driven in desired subframes and subfields. More specifically, the display device controller 90 uses the bit splitting technique which uniformly distributes, in the respective periods of the R display period, G display period, and B display period, the time to reflect, by the DMD, each light ray from the corresponding light source so as to reduce nonuniformity of the light reflection time, thereby smoothing the luminance.

Figure 3:
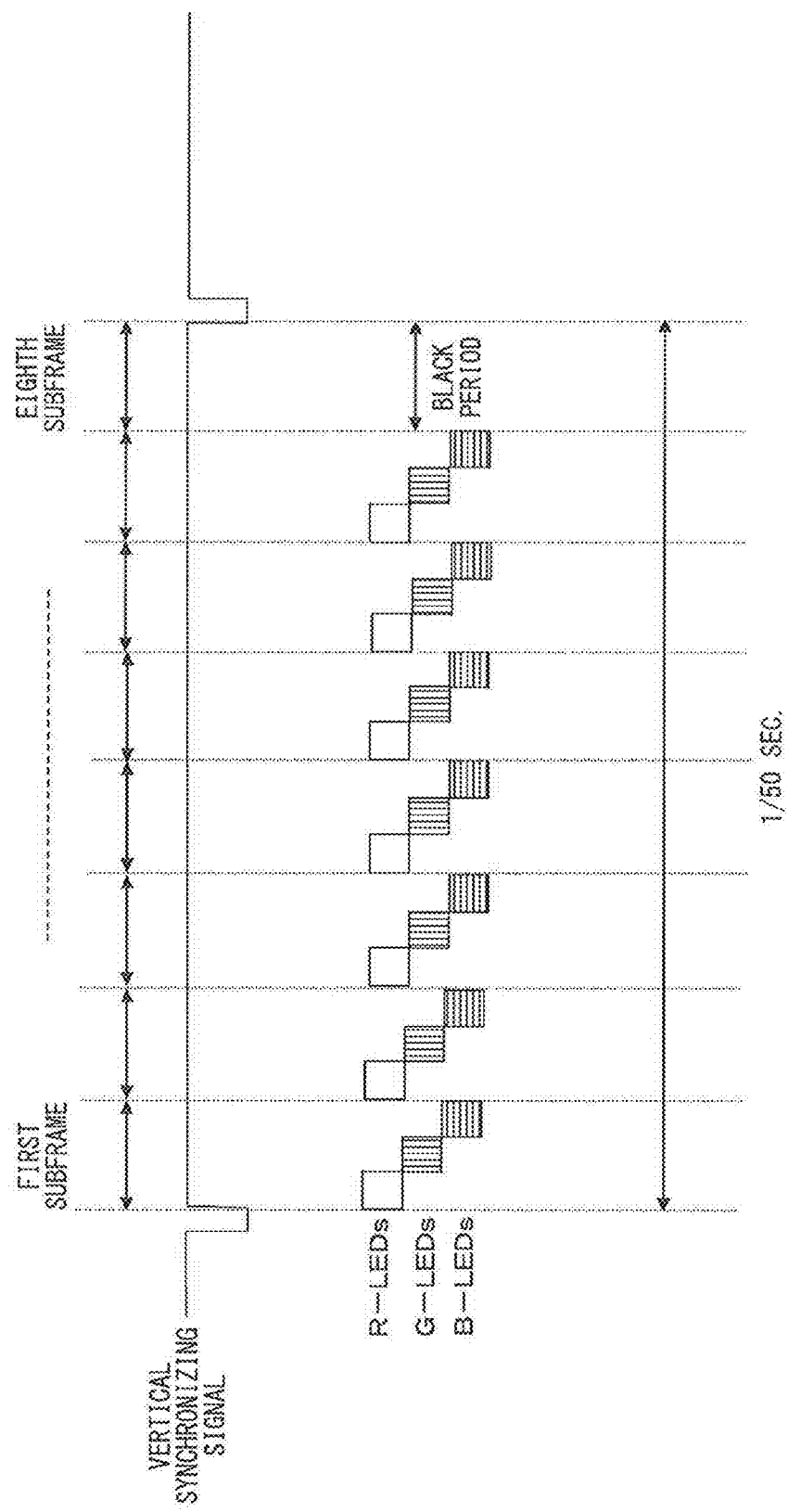
FIG. 3 is a timing chart illustrating an operation of an LED module 210 in the case where a PAL (Phase Alternating Line) signal whose vertical synchronizing signal has a frequency of 50 Hz is inputted.

FIG. 3 is a timing chart illustrating an operation of the LED module 210 in the case where a Phase Alternating Line (PAL) signal whose vertical synchronizing signal has a frequency of 50 Hz is inputted. As illustrated in FIG. 3, one cycle (1/50 sec) includes eight subframes, and each subframe includes R-LED subfield, G-LED subfield, and B-LED subfield.

In each subfield, to smooth the luminance, 8-bit patterns (256 patterns) are divided by eight into 32 levels, each having five luminance levels.

Turning off all the R-LED, G-LED, and B-LED is performed in units of subframes. As shown in FIG. 3, all the R-LEDs, G-LEDs, and B-LEDs is turned off in the eighth subframe, which is the last subframe, whereby a black period is realized in the subframe.

Next, an operation of the projector 100, which is an image display device according to the present invention, will be described.

A PAL signal inputted through the VIDEO terminal 11 is separated by the Y/C separation circuit 23 into a Y-signal and a C-signal, and the separated Y-signal and C-signal are subjected to color decoding by the color decoder 22, and decoded into a Y-signal, a Pb signal, and a Pr signal. The Y-signal, the Pb signal, and the Pr signal are converted to an R signal, a G signal, and a B signal, and then are subjected to A/D conversion by the A/D converter 30.

The resizing circuit 40 resizes the digital signal which is subjected to the A/D conversion by the A/D converter 30 to 1024×768 pixels so as to correspond to the resolution of the DMD 91, and then writes the resized digital signal into the frame memory 61. The digital signal written into the frame memory 61 is outputted from the frame memory 61 in association with a synchronization signal.

The display device controller 90 generates subfields and subframes so that lighting times of the R-LED, G-LED, and B-LED in the LED light source module 210 satisfy the timing chart illustrated in FIG. 3, and transfers the data to the DMD 91. In addition, the display device controller 90 controls ON/OFF of the DMD 91 thereby to realize the gradation expression.

Here, in the case of the PAL signal, its vertical synchronizing signal has a frequency of 50 Hz, and one subframe period thereof is longer than that of NTSC signal, whose vertical synchronizing signal has a frequency of 60 Hz. As shown in FIG. 3, in the eighth subframe period, all the R-LEDs, G-LEDs, and B-LEDs are turned off to provide a black period, and thereby motion blur is reduced.

The more the number of subframes of the black period increases, the more the motion blur is reduced, and thereby the moving image resolution can be improved. However, the increased number of subframes of the black period deteriorates the projector luminance. In that case, the number of subframes of the black period is controlled depending on the type of content and operating environment.

As described above, according to the projector 100, i.e., the image display device of the present invention, the black period is provided in the last frame of the eighth subframe, as shown in FIG. 3, and thereby it is possible to reduce image blur (motion blur) caused by after-images remaining on the retina of a person's eyes when viewing moving objects.

According to the projector 100, i.e., the image display device of the present invention, the luminance is smoothed by using the bit splitting technique, which avoids generation of moving image pseudo contours. And in addition, a period allocated to each bit of luminance does not depend on the size of the bit, but the luminance is uniformly distributed in the respective subframe periods, and thus smooth luminance distribution is realized. As a result, even if a black period is provided in the subframe, it is possible to minimize gradation insufficiency, and thus the motion blur reduction effect by the black period insertion can be exerted.

As shown in FIG. 3, this embodiment describes the case where the PAL signal is inputted, whose vertical synchronizing signal has the frequency of 50 Hz. However, the present invention is not limited to this, but for example, a NTSC signal whose vertical synchronizing signal has a frequency of 60 Hz may be applied.

Figure 4:
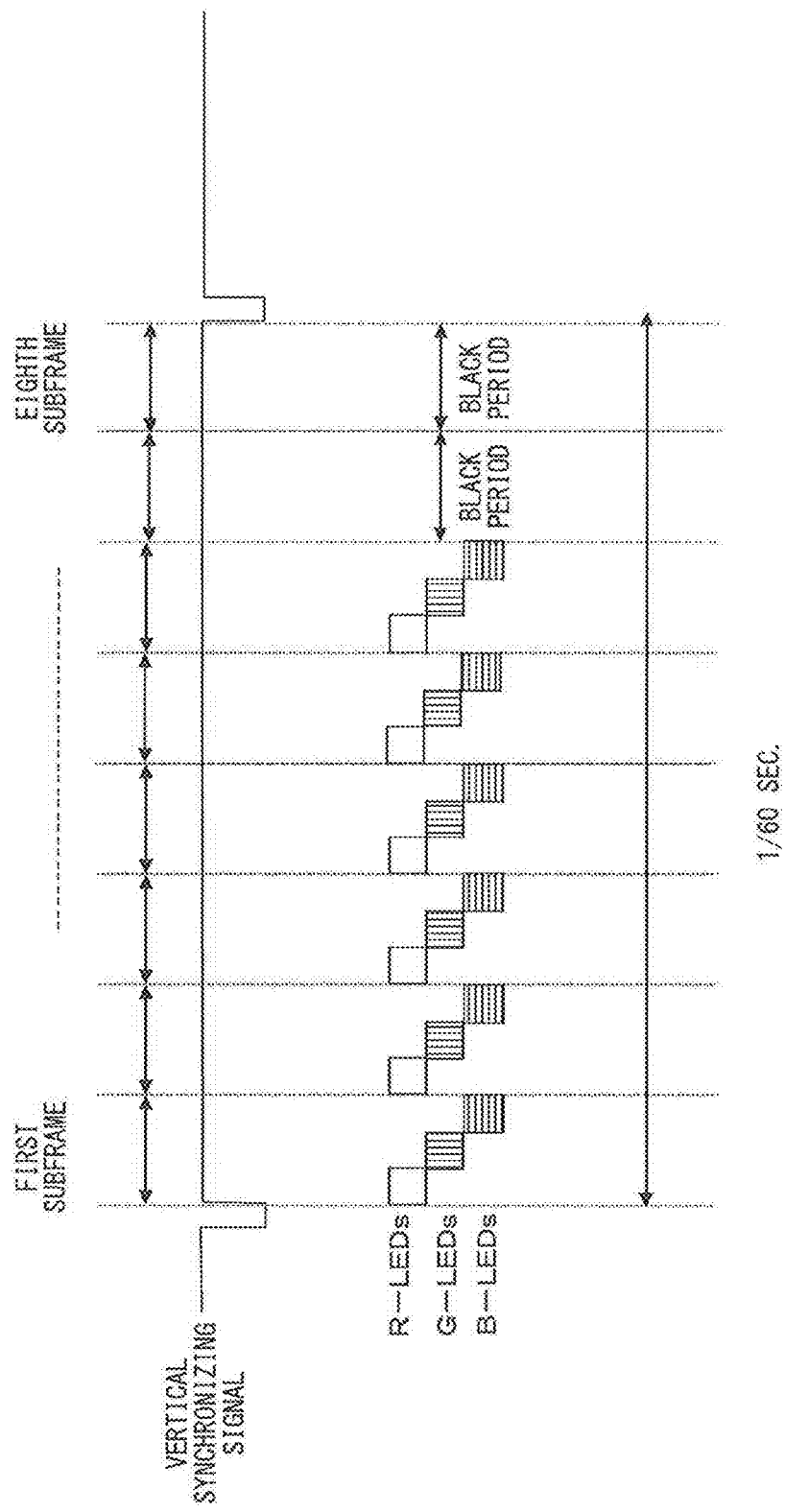
FIG. 4 is a timing chart illustrating an operation of the LED module 210 in the case where an NTSC (National Television System Committee) signal whose vertical synchronizing signal has a frequency of 60 Hz is inputted.

FIG. 4 is a timing chart illustrating an operation of the LED module 210 in the case where the NTSC signal whose vertical synchronizing signal has the frequency of 60 Hz is inputted. As shown in FIG. 4, one cycle (1/60 sec) includes eight subframes, and each subframe period is shorter than that illustrated in FIG. 3. Accordingly, in the consecutive two subframe periods, i.e., in the seventh and eighth subframes, all the R-LEDs, G-LEDs, and B-LEDs are turned off to provide a black period, and thereby motion blur is reduced.

Further, in FIG. 3 and FIG. 4, among the first to eighth subframes, the last frame of the eighth subframe, or the consecutive last two subframes of the seventh and eighth subframes, are set as the black period. However, setting of the black period is not limited to these.

Figure 5:
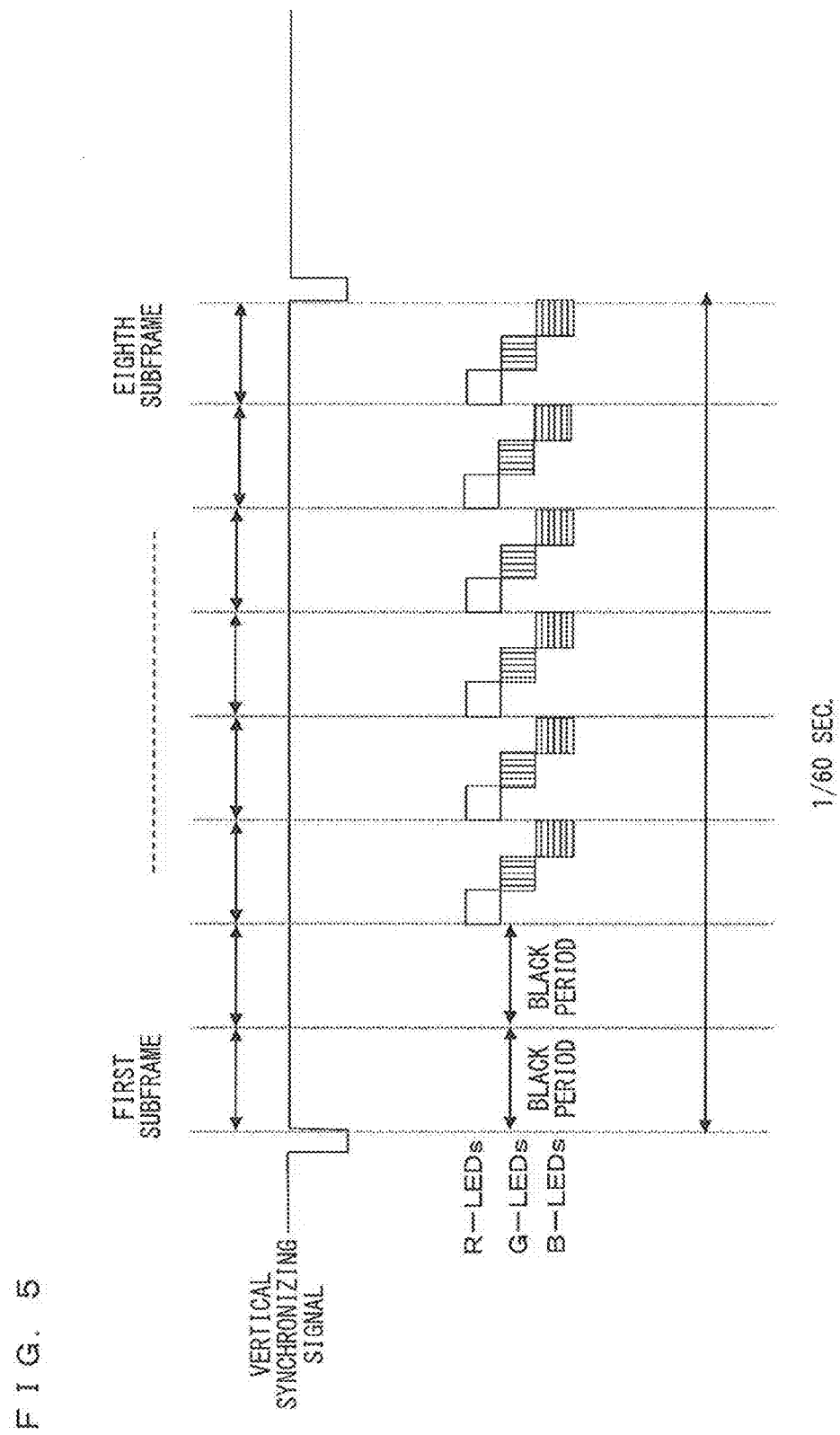
FIG. 5 is a timing chart illustrating an operation of the LED module 210 in the case where first and second subframes, which are two consecutive subframes of first to eighth subframes, are set as black periods.

For example, in the case where images change on a frame-by-frame basis, at respective frame boundaries, the first frame, or the first consecutive two subframes, i.e., the first and second subframes, among the first to eighth subframes, may be set as the black period. FIG. 5 is a timing chart illustrating an operation of the LED module 210 in the case where the first two consecutive subframes among the first to eighth subframes, i.e., the first and second subframes, are set as the black period. As shown in FIG. 5, after a synchronization signal is inputted, in the two consecutive subframe periods of the first and second subframes, all the R-LEDs, G-LEDs, and B-LEDs are turned off to provide the black period. Accordingly, motion blur can be reduced, in the same manner as the case where all the R-LEDs, G-LEDs, and B-LEDs are turned off in the consecutive two subframe periods of the seventh and eighth subframes to provide the black period.

In FIG. 4, the center of the luminance (central luminance) of an image of a frame is located in the third and fourth subframes, whereas in FIG. 5, the central luminance is located in the fifth and sixth subframes. Thus, by setting the black period either in the seventh and eighth subframes or in the first and second subframes, among the first to eighth subframes, it is possible to adjust image delay relative to sound.

In the case where the vertical synchronizing signal has the frequency of 60 Hz, all the R-LEDs, G-LEDs, and B-LEDs are turned off in two or three subframes to provide the black period, whereby motion blur is reduced, and in addition, deterioration in the projector luminance can be made indistinct. Specifically, 10 to 30% of all the subframes can be set as the black period.

Here, the more the number of subframes of the black period is increased, the more the motion blur is reduced, and thereby the moving image resolution can be improved. However, the increased number of subframes of the black period deteriorates the projector luminance. In that case, the number of subframes of the black period is controlled depending on the type of content, and operating environment.

Second Embodiment

A picture display system according to a second embodiment of the present invention will be described with reference to FIG. 6.

Figure 6:
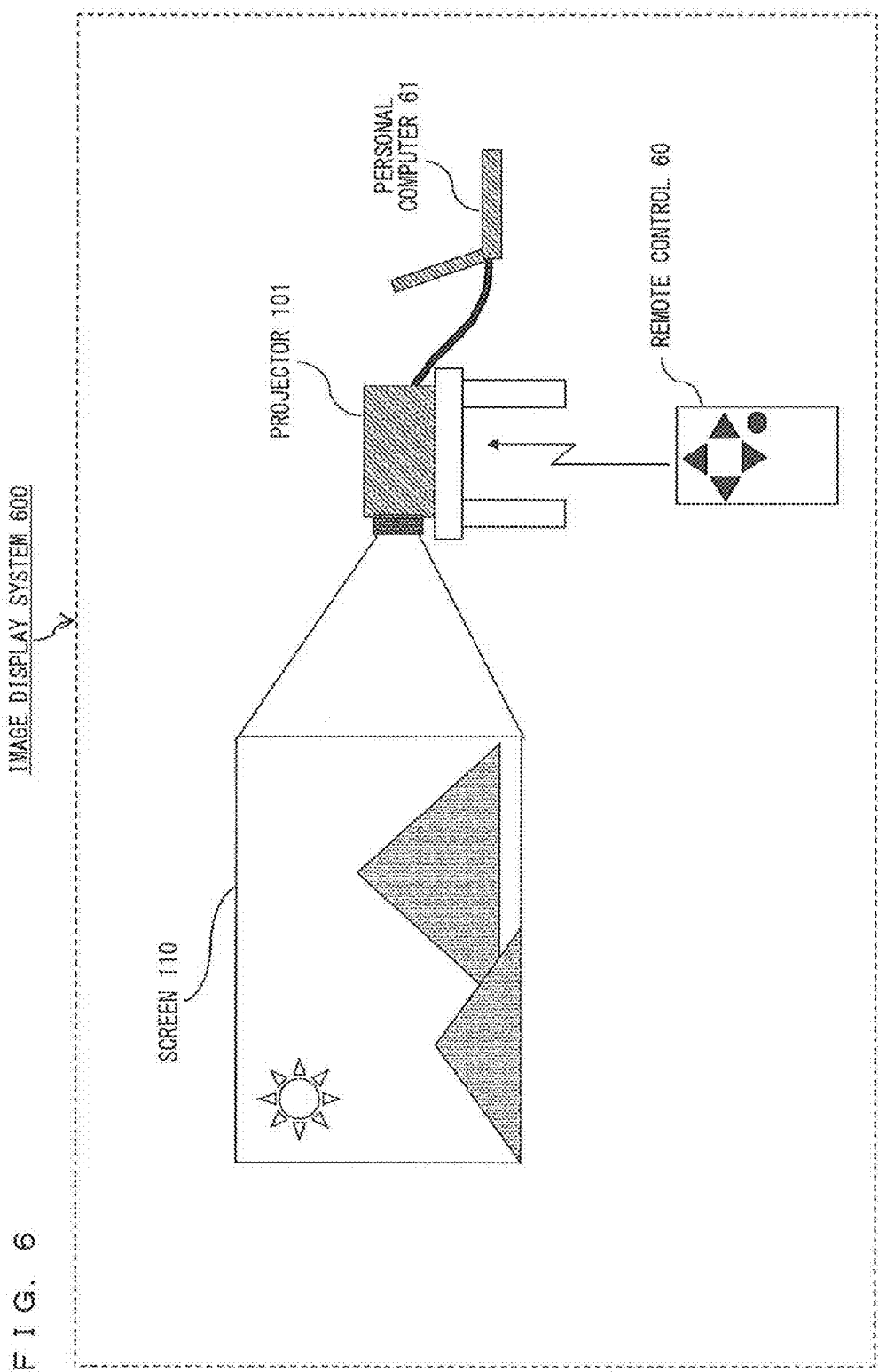
FIG. 6 is a configuration diagram illustrating the outer appearance of an image display system 600 employing a projector 101, which is an image display device according to the present invention.

FIG. 6 is a configuration diagram illustrating the outer appearance of an image display system 600 employing a projector 101, which is an image display device of the present invention. In FIG. 6, a personal computer 61 is connected to an RGB terminal (corresponding to the RGB input 160 of the projector 100 illustrated in FIG. 1) of the projector 101, and an image on the personal computer 61 is projected on a screen 110 by the projector 101. In this case, functions of the projector 101 may be controlled by the user's operation of a remote control 60.

The basic configuration of the projector 101 according to this embodiment is substantially the same as that of the projector 100 according to the first embodiment of the present invention illustrated in FIGS. 1 and 2. Thus no description will be given of the same components in the configuration, and those components which are different from those in the projector 100 will be described.

Figure 7:
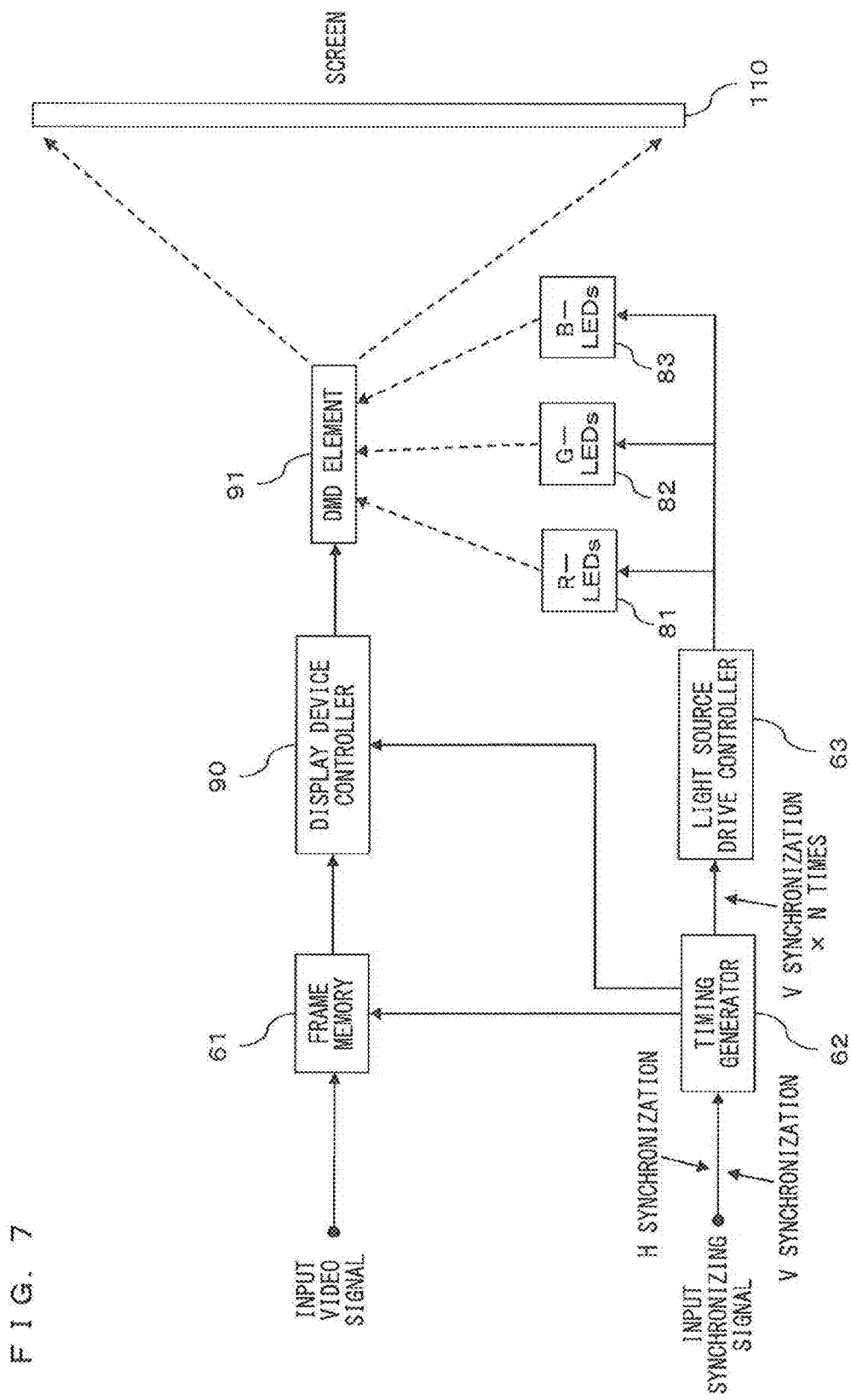
FIG. 7 is a functional block diagram illustrating the internal configuration of the projector 101.

FIG. 7 is a functional block diagram illustrating the internal configuration of the projector 101. FIG. 7 illustrates the relation between an input video signal and an input synchronization signal, and also illustrates in detail a part of the internal configuration which is different from that of the projector 100 illustrated in FIG. 2.

The input video signal, which is resized by the resizing circuit to have the same resolution as the DMD, is written into the frame memory 61 based on a timing signal which is generated by the timing generator 62 using the input synchronization signal as the reference.

Next, based on an output synchronization signal generated by the timing generator 62, image data of one frame is read from the frame memory 61. The display device controller 90 generates, based on the read image data of one frame, subframes each further divided into subfields thereby to control the DMD 91.

The light source drive controller 63 controls lighting of R-LEDs 81, G-LEDs 82, and B-LEDs 83 in the LED light source module, based on n-times synchronization signals which corresponds to n subframes generated by the timing generator 62.

In the projector 101 according to this embodiment, in which subframe period the black period is to be provided is substantially the same in the first embodiment of the present invention illustrated in FIG. 3 to FIG. 5. In this embodiment, the number of subframes of black period can be also controlled depending on the type of content and operating environment. The number of subframes of the black period may be set by a user's selection of a display mode. That is, the user operates the remote control 60 or the operation buttons 140 to select the display mode. Alternatively, projectors may have their individual display modes which are set in advance depending on the types of the projector.

Figure 8:
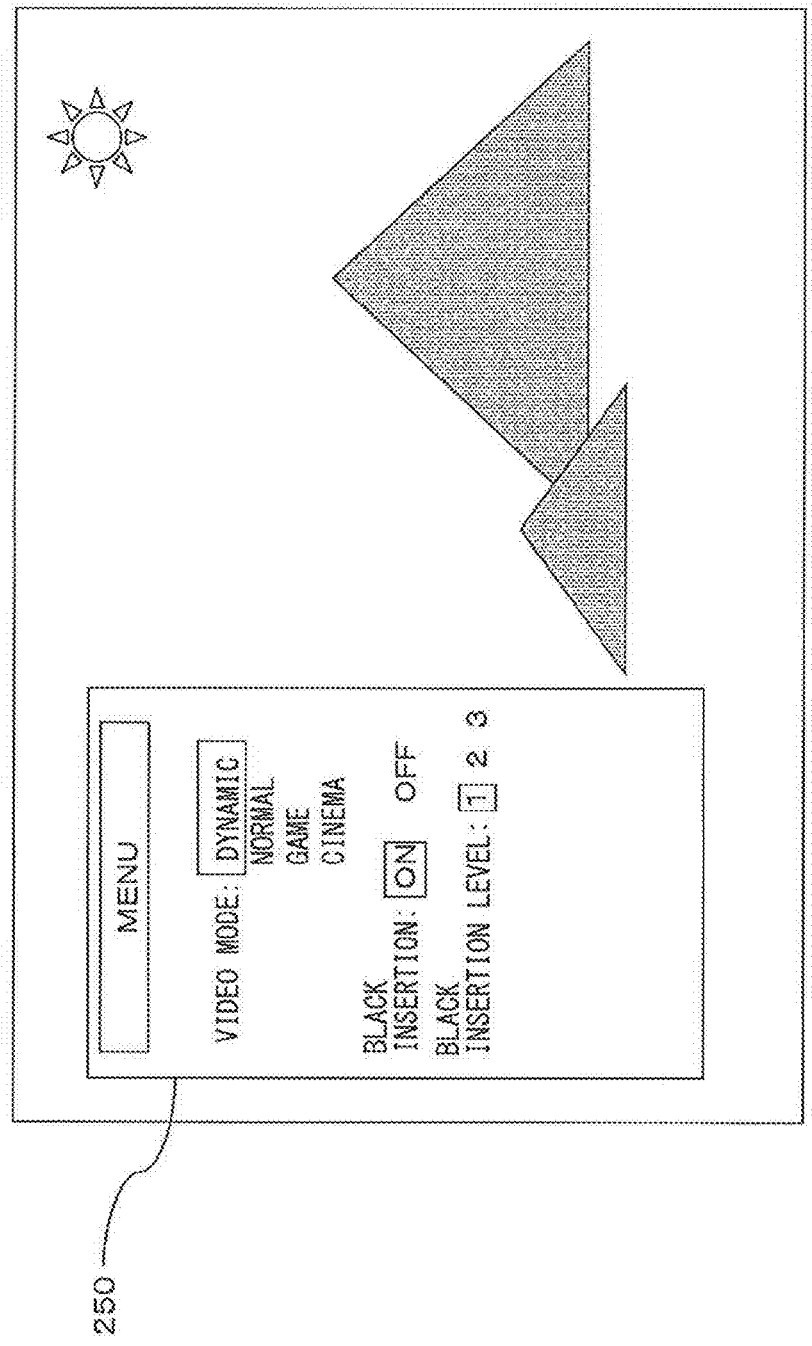
FIG. 8 is a diagram illustrating how to control, in the projector 101, the number of black period subframes depending on the type of content and operating environment.

FIG. 8 is a diagram illustrating how to control the number of subframes of the black period, in the projector 101, depending on the type of content and operating environment. As shown in FIG. 8, in the projector 101, video modes are prepared in advance which include, for example, a cinema mode which suppresses brightness of highlighted portions in movie contents, a dynamic mode which emphasizes brightness, and the like. Insertion of a black period in the dynamic mode, which emphasizes brightness, deteriorates the brightness. Thus, in such a video mode, insertion of the black period is controlled not to be performed.

As described above, depending on the video modes, the light source drive controller 63 controls the R-LEDs 81, G-LEDs 82, and B-LEDs 83 not to be turned off in subframes, or controls the number of subframes during the period of which all the LEDs are turned off, and thereby the light source drive controller 63 controls the number of subframes of the black period.

Alternatively, an ON/OFF control of black period insertion may be performed on a onscreen menu 250 by the user's manual operation using the remote control 60 or the operation buttons 140. Alternatively, it may be set such that the user may be allowed to select the number of subframes (level) of the black period to insert the black period.

As described above, if operation of the remote control 60 or the operation buttons 140 allows the user to select a video mode, to determine whether the black period is to be inserted, and to determine how many number of subframes (level) of the black period are to be inserted, then the user can easily reduce motion blur in accordance with the types of content and operating environment. Accordingly, an optimal setting can be realized to maintain the projector luminance.

That is, an optimal setting can be realized for various content in accordance with the type of content and the operating environment—for example, a game content which includes objects moving at high speed and thus requires a longer black period, or a content including few moving images which requires improved brightness and thus requires a shorter or no black period.

To the RGB/YPbPr terminal 13, an RGB signal or a YPbPr signal is inputted. Generally, the YPbPr signal represents a moving image, and the RGB signal represents a still image. Thus, it can be set such that if the YPbPr signal is inputted, the number of subframes of the black period is increased.

Still, there may be a case where an RGB signal which represents a moving image is inputted. In this case, it can be set such that even if the RGB signal is inputted, the user can manually increase the number of subframes of the black period thereby to reduce motion blur.

The projectors according to the first and second embodiments of the present invention turn off the LEDs and generate the subframe of the black period, thereby realizing reduction in motion blur. However, the technique of generating the subframe of the black period is not limited thereto. For example, the subframe of the black period may be generated by controlling the display device controller 90 thereby to output a black signal as a video signal, and this technique exerts the same effect as the above-described technique.

The projectors according to the first and second embodiments of the present invention employ the DMD. However, the projector may be realized by an LCD projector.

The processing of the present invention may be realized by software. That is, the present invention is not limited to an image display device, and is applicable to a display method.

While the invention has been described in detail, the foregoing description is in all aspects illustrative and not restrictive. It will be understood that numerous other modifications and variations can be devised without departing from the scope of the invention.

What is claimed is:

1. An image display device for projecting and displaying an image on a screen, the device comprising:
   a plurality of solid-state light sources;
   a light-source drive controller configured to, in each of consecutive subframes included in a period of each frame and when displaying moving images by changing images on a frame-by-frame basis, control driving of the plurality of solid-state light sources and turn on the plurality of solid-state light sources in accordance with a plurality of subfields of each of the subframes; and
   an image display portion configured to display the subframes on the screen during a period of the consecutive subframes, by modulating light emitted from the plurality of solid-state light sources based on image data of the frame; wherein
   the light-source drive controller is configured to turn off all the plurality of solid-state light sources during a black period which is other than the period of the consecutive subframes and which is inserted before or after the period of the consecutive subframes in the period of each of the frames.

2. The image display device according to claim 1, wherein the black period is inserted in the beginning or end of the period of each of the frames.

3. The image display device according to claim 2, wherein a length of the black period corresponds to a length of a predetermined number of two or more of the subframes.

4. The image display device according to claim 1, wherein the length of the black period is changeable in accordance with the type of content and operating environment of the image display device.

5. The image display device according to claim 1, wherein a length of the black period corresponds to a length of the subframe.

6. The image display device according to claim 1, wherein a length of the black period is 10 to 30% of the period of the frame.

* * * * *